Patented Feb. 7, 1950

2,496,358

UNITED STATES PATENT OFFICE 2,496,358

PROCESS FOR PRODUCING CONDENSATION PRODUCTS

John Ross, Ramsay, and Arthur Ira Gebhart, Union, N. J., assignors to Colgate-Palmolive-Peet Company, Jersey City, N. J., a corporation of Delaware No Drawing. Application August 28, 1946, Serial No. 693,571

5 Claims. (Cl. 260—342.4)

The present invention relates to a process for producing condensation products of maleic anhydride and similar materials and, more particularly, to an improved process for producing a preponderance of simple condensation products from maleic anhydride and an olefinic hydrocarbon.

The prior art has described methods for condensing olefins with aliphatic acids or anhydrides having the alpha-beta-enal group C=C—C=O to form alkenyl-substituted carboxylic acids, but the methods disclosed produce a mixture of simple and complex condensation products. The prior art provided no satisfactory means for controlling the proportion of simple to complex condensation products and the mixture was usually so difficult to separate into its components that frequently isolation of the individual compounds was not even attempted.

It is an object of the present invention to provide a novel method for producing alkenyl-substituted carboxylic acids.

It is another object of this invention to provide a new method of condensing olefins with aliphatic acids and anhydrides having an alpha-beta-enal group whereby a high proportion of simple condensation products is produced.

It is also an object of the invention to provide an improved process of condensing maleic anhydride with an olefin to form a high proportion of mono-alkenyl-succinic acid.

Other objects and advantages of this invention will be apparent from the following description.

According to the present invention, the olefin and the unsaturated acid or anhydride are mixed together for condensation in the substantial absence of peroxides and preferably in approximately stoichiometric proportions. This is accomplished by removing the peroxides normally present in olefins prior to contacting the olefins with the unsaturated acid or anhydride.

Appreciable quantities of peroxide are present in olefins, usually amounting to at least 0.01% oxygen by weight as peroxide oxygen. Such peroxide may be substantially removed by any of several methods, one suitable procedure being to warm the olefin for several hours in contact with a small amount of an alkali metal, say metallic sodium, and then to distill the olefin from additional alkali metal. The olefin distillate thereby obtained is substantially free of peroxides. It must be promptly used in the condensation reaction of this invention, because, upon standing for a few days or less, peroxides are again formed in the olefin.

Identification of the simple condensation products of the present reaction has now been made possible, as the amount of complex compounds produced in the absence of peroxides is low enough to offer little interference with the separation and isolation of the simple condensation products. According to one theory of operation, the condensation results in attachment of the olefin to the unsaturated acid or anhydride through one of the double-bond carbons of each compound, with elimination of the double bond of the unsaturated acid or anhydride and progression of the double bond of the olefin to an adjacent carbon. This theory is intended solely as a suitable explanation of the results observed and analyses made and is for the benefit of those skilled in the art. It is in no wise to be considered a limitation of the invention described.

Thus, according to this theory, the condensation of hexadecene-1 (peroxide-free) and maleic anhydride would largely proceed according to the following reaction:

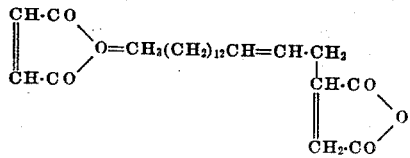

The olefins employed in the present reaction may be aliphatic or alicyclic. They may have straight or branched chains, and they may be mono-olefins or non-conjugated polyolefins. They may be unsubstituted or they may bear non-reactive substituent groups, including carbonyl, halogen, ether, alkyl and aryl groups. In general, it is preferred to employ olefins having about 8 to about 24 carbon atoms per molecule, and aliphatic olefins of about 8 to 18 carbons have given particularly satisfactory results. Suitable olefins and olefin derivatives include decene, dodecene, triisobutylene, hexadecene, docosene, tridecenyl chloride, 6,9-pentadecadiene, dinonenyl ether, amyl-hexenyl ketone, cyclooctene, civetane, dipentene, 3-octylcyclobutene, and the like.

These olefinic materials may be condensed, after substantial elimination of peroxides, with compounds having a double bond between two carbon atoms conjugated with one or more carbonyl or carboxyl groups. Such compounds are preferably aliphatic and contain up to about 7 carbon atoms per molecule, such as maleic or fumaric acid, acrylic acid, crotonic acid, itaconic acid, citraconic acid, etc., and their homologs, analogs, esters and anhydrides. Similarly, aconitic acid, glutaconic acid, quinone, naphthoquinone, toluquinone, phorone, benzolacetone, mesityl oxide, piperic acid, ketenes, dibenzylidene acetone and their homologs, and analogs may be employed.

The condensation is carried out by mixing the reactants together, free of peroxide contamination, and heating the mixture for about one to about four hours. A temperature of about 150° C. to about 250° C., preferably about 180° C. to about 225° C., is employed, and the mixture is agitated during the heating. It is preferred to supply an inert atmosphere, such as nitrogen, to eliminate the presence of oxygen and thus to minimize any tendency toward formation of peroxides during the reaction.

Although equimolecular proportions of the peroxide-free olefin and the unsaturated acid or anhydride are preferably employed, the proportions of the two reactants may also be varied, though with less satisfactory results for the present purpose. An excess of the unsaturated acid or anhydride, while it increases the proportion of complex condensation products to simple condensation products formed, does not materially affect the yield of simple condensation products produced, merely increasing the amount of complex condensation products; this increase is disadvantageous when only the simple condensation product is desired.

Upon completion of the reaction, the reaction mixture may be distilled directly. Unreacted starting materials and the simple anhydride condensation product come over, in general, in separate fractions, facilitating isolation of the product, which frequently solidifies at room temperature. The distillation usually leaves a residue comprising higher molecular weight complex condensation materials.

Another recovery method which has been found satisfactory is to form the methyl or other alkyl ester by esterification with the corresponding alcohol and then to separate the ester by distillation.

If desired, adjuvant materials may be admixed with the condensation product after distillation, or such materials may be incorporated with the product during or after condensation if purification by distillation is unnecessary for the purpose desired. Thus, fillers, builders, dyestuffs, etc. may be added before, during or after condensation depending upon the ultimate use of the material.

The following examples, described herein, are merely illustrative of the present invention, and it will be understood that the invention is not limited thereto.

EXAMPLE I

A quantity of hexadecene-1 is put in a vessel over a few chips of metallic sodium and is warmed overnight on a steam bath. A little fresh sodium is then added, and the hexadecene is distilled. About 50 parts by weigh of the freshly-distilled hexadecene is put in a three-neck flask furnished with a mechanical stirrer, and 23 parts of maleic anhydride is introduced. Agitation is begun, and a slow stream of nitrogen is passed into and through the flask to remove atmospheric air. The temperature is rapidly raised to 190° C., and the heating is continued for about three hours, agitation and passage of the nitrogen being maintained during this period. The temperature gradually rises to 219° C., and the mixture is then cooled in the nitrogen stream to yield a clear, light brown, viscous liquid.

Methyl alcohol is then added in considerable excess of the amount required for esterification, and a small quantity of sulphuric acid is introduced as an esterification catalyst. The mixture is refluxed to form methyl esters, which are taken up in ether. A dilute aqueous solution of potassium carbonate is added to remove unesterified acids equivalent to about 11 parts. The esters are then distilled under reduced pressure equivalent to one millimeter of mercury as follows:

| Temperature °C. | Parts by weight |
|---|---|
| to 140° | 21.2 (15.0 parts being hexadecene). |
| 140–180° | 2.5. |
| 180–195° | 39.2 (condensation product dimethyl ester). |
| Residue | 3.0. |

This gives a yield of simple condensation product ester equivalent to about 68%, calculated on the basis of hexadecene reacted. Moreover, the ratio of the ester of the simple condensation product to unesterified acids is approximately 3.6 to 1. These figures may be compared with results obtained when carrying out the condensation with hexadecene-1 from which the peroxides are not removed:

TABLE I

*Maleic anhydride-hexadecene condensation*

| | Yield of monomeric condensation prod. esters | Ratio of monomeric esters to unesterified acids |
|---|---|---|
| | Percent | |
| Hexadecene (containing naturally-occurring peroxide) | 36 | 0.6/1 |
| Hexadecene (peroxide-free) | 68 | 3.6/1 |

The product obtained is an oily liquid and has a good clear color.

EXAMPLE II

Hexadecene-1 is treated with sodium and distilled in the manner described in Example I, and 25 parts by weight of the freshly distilled hexadecene is then condensed with about 11 parts of maleic anhydride as detailed in that example. Employing agitation and an atmosphere of nitrogen, the temperature is rapidly raised to 195° C. and heating is continued for about 2½ hours, during which period the temperature gradually goes up to 223° C. The product is then distilled at a pressure of one millimeter of mercury as follows:

| Temperature, °C. | Parts by weight |
|---|---|
| to 110° | 0.5 (maleic anhydride). |
| 110–115° | 7.2 (hexadecene). |
| 199–204° | 15.0 (simple condensation product). |
| Residue | 4.7. |

The condensation product comprising predominantly the alkenyl succinic acid anhydride, rapidly solidifies upon cooling to room temperature. The yield of simple condensation product, calculated on the basis of hexadecene reacted, is equivalent to 59%, as compared with a 15% yield when starting with hexadecene-1 from which the peroxides are not removed.

EXAMPLE III

Mixed olefins are prepared by thermally cracking a quantity of paraffins, and this material is subjected to vacuum distillation at a pressure equivalent to about one millimeter of mercury. A fraction boiling at this reduced pressure between 90° C. and 125° C. is taken, this fraction having an iodine value of 60.0 and corresponding approximately to an average chain length of 16 carbon atoms. A quantity of these mixed olefins is shaken with an acidulated ferrous sulphate solution to remove peroxides, and the olefins are then distilled. About 172 parts by weight of the freshly-distilled olefins is mixed with some 40 parts of maleic anhydride and heated at about 195° C. to about 215° C. for four hours. A large yield of simple condensation product is obtained upon vacuum distillation.

EXAMPLE IV

Peroxides are removed from triisobutylene by heating in contact with metallic sodium for several hours and then distilling over fresh sodium chips. About 168 parts by weight of the freshly-distilled triisobutylene is then heated with 98 parts of maleic anhydride in an autoclave at a temperature of approximately 215° C. for a period of two to three hours. Upon cooling, the mass is found to comprise a predominant proportion of the simple condensation anhydride.

EXAMPLE V

Peroxides are removed from a quantity of octadecene-1, and about 513 parts by weight of the peroxide-free octadacene is mixed with 200 parts of maleic anhydride and heated for some three and a half hours at a temperature of 200° C. to 220° C. Upon vacuum distillation, about 156 parts of unreacted octadecene is recovered, and further distillation at 0.5 millimeter of mercury pressure yields about 244 parts of simple condensation product. This is separated by crystallization from a solvent.

EXAMPLE VI

About 100 parts by weight of peroxide-free hexadecene-1 is mixed with 35 parts of crotonic anhydride. The mixture is heated to 225° C., and heating is continued for some six hours, during which time the temperature is allowed to rise to 250° C. The resulting reaction mixture is then subjected to esterification by treatment with methanol and sulphuric acid. Excess methanol is removed, and the product is diluted with water, taken up with ether and washed with a 3% aqueous sodium carbonate solution to remove unesterified acids and discoloring materials. After washing, drying and removing the ether, the reaction product is recovered as an oily liquid. Methyl crotonate formed in the esterification is then distilled off, and a subsequent vacuum distillation yields about 40 parts of condensation product ester comprising the dimethyl ester of the simple condensation product.

Salts of the simple condensation products obtained by the present process exhibit fine surface active properties. The anhydride condensation product may be used in relatively purified condition after distillation or in admixture with the small amount of complex products formed. The sodium salts of these compounds are valuable detergents, wetting agents and emulsifiers, or they may be used in the preparation of such materials. They are useful in preparing waxes and polishes, flotation agents, pigment vehicles, rubber compounding materials and the like.

Although the present invention has been described with respect to particular embodiments and examples, it will be apparent to those skilled in the art that variations and modifications of this invention can be made and that equivalents can be substituted therefor without departing from the principles and true spirit of the invention. Thus, it will be apparent to those skilled in the art that this invention is not limited to any specific method for removing peroxides from olefins and olefinic compounds. The art is acquainted with various procedures for accomplishing such removal. These include treatment with reducing agents including such metallic elements as sodium, zinc, tin, copper, and finely divided nickel or iron, such salts or salt solutions as sodium sulphite, hydrosulphite or thiosulphate or with ferrous, cuprous or stannous salts in neutral or acid solution, such gases as sulphur dioxide or hydrogen sulphide, and various metallic couples, such as aluminum-copper, aluminum-mercury, zinc-copper or zinc-mercury, or passage of the olefin or olefinic compound through an adsorption column of activated charcoal, silica, alumina, magnesia, etc.

We claim:

1. The process comprising treating peroxide contaminated olefinic hydrocarbons having 8 to 24 carbon atoms per molecule with a reducing agent to destroy the peroxides, distilling the hydrocarbons from the treated material whereby a peroxide-free distillate is obtained, and heating said distillate while still peroxide-free with approximately the stoichiometric amount of maleic anhydride for about one to four hours at a temperature of about 150° to 250° C. in an inert atmosphere whereby simple condensation products of said olefine and said maleic anhydride are produced in high yield relative to the yield of complex condensation products.

2. The process which comprises treating a peroxide contaminated olefinic hydrocarbon by chemical reaction to destroy the peroxides, distilling the treated material to recover a peroxide-free olefinic hydrocarbon, and heating the recovered hydrocarbon while still peroxide-free with a compound having an alpha-beta-enal group and up to 7 carbon atoms per molecule in approximately stoichiometric proportions at a temperature of about 150° C. to 250° C. for about one to four hours whereby simple condensation products of said compound with said hydrocarbon are produced in high yield relative to the yield of complex condensation products.

3. The process as set forth in claim 2 in which said compound is an aliphatic acid anhydride.

4. The process as set forth in claim 2 in which said compound is an aliphatic acid.

5. The process as set forth in claim 2 in which said compound is an ester of an aliphatic acid.

JOHN ROSS.
ARTHUR IRA GEBHART.

REFERENCES CITED

The following references are of record in the file of this patent:

UNITED STATES PATENTS

| Number | Name | Date |
| --- | --- | --- |
| 2,283,214 | Kyrides | May 19, 1942 |
| 2,360,426 | Kyrides | Oct. 17, 1944 |
| 2,365,703 | Jahn | Dec. 26, 1944 |
| 2,411,215 | Kise et al. | Nov. 19, 1946 |
| 2,440,985 | Sutherland | May 4, 1948 |

OTHER REFERENCES

Kalichevsky et al. "Chemical Refining of Petroleum," 2nd edition, 1942, page 390.

Certificate of Correction

Patent No. 2,496,358                                              February 7, 1950

JOHN ROSS ET AL.

It is hereby certified that errors appear in the printed specification of the above numbered patent requiring correction as follows:

Column 1, line 2, for "producting" read *producing*; column 2, lines 21 to 27 inclusive, for that portion of the formula reading

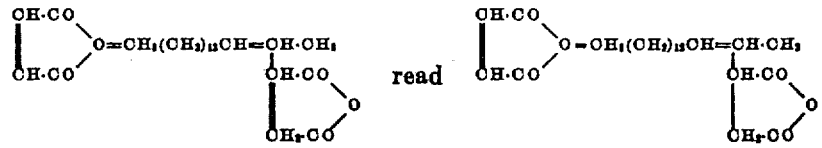

column 3, line 57, for the word "weigh" read *weight*;

and that the said Letters Patent should be read with these corrections therein that the same may conform to the record of the case in the Patent Office.

Signed and sealed this 13th day of June, A. D. 1950.

[SEAL]

THOMAS F. MURPHY,
                                                         *Assistant Commissioner of Patents.*